(12) United States Patent
Andersson et al.

(10) Patent No.: US 7,578,641 B2
(45) Date of Patent: Aug. 25, 2009

(54) TOOL AND A CUTTING INSERT FOR CHIP REMOVING MACHINING

(75) Inventors: Claes Andersson, Valbo (SE); Kjell Englund, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 127 days.

(21) Appl. No.: 11/987,915

(22) Filed: Dec. 5, 2007

(65) Prior Publication Data
US 2008/0166191 A1    Jul. 10, 2008

(30) Foreign Application Priority Data
Dec. 12, 2006    (SE)    .................................... 0602676

(51) Int. Cl.
*B23C 5/00*    (2006.01)
*B23C 1/00*    (2006.01)

(52) U.S. Cl. .......................... 407/113; 407/66; 407/103

(58) Field of Classification Search ......... 407/113–116, 407/66, 67, 87, 91, 103, 109
See application file for complete search history.

(56) References Cited

U.S. PATENT DOCUMENTS

| 3,629,919 | A | 12/1971 | Trevarrow, Jr. | |
| 4,209,047 | A | 6/1980 | Weill | |
| 5,924,826 | A * | 7/1999 | Bystrom et al. | 407/103 |
| 6,146,061 | A | 11/2000 | Larsson | |
| 6,152,658 | A * | 11/2000 | Satran et al. | 407/103 |
| 7,001,114 | B2 * | 2/2006 | Blücher et al. | 407/103 |
| 7,510,354 | B2 * | 3/2009 | Andersson et al. | 407/113 |
| 7,537,419 | B2 * | 5/2009 | Sjöberg et al. | 407/103 |

FOREIGN PATENT DOCUMENTS

| EP | 1 702 703 A1 | 9/2006 |
| WO | WO 97/11806 | 4/1997 |

* cited by examiner

*Primary Examiner*—Willmon Fridie
(74) *Attorney, Agent, or Firm*—Drinker Biddle & Reath LLP

(57) ABSTRACT

A tool for chip removing machining, including a basic body and a cutting insert detachably connected to the basic body via an interface. The interface includes a first connecting surface formed in the basic body in which a chute is formed that has two side-flank surfaces diverging from a bottom. The interface also includes a second connecting surface formed in the cutting insert in which there are formed a number of male members having converging side-flank surfaces that abut against the side-flank surfaces of the chute, and at least one transverse shoulder surface that abuts against a transverse stop surface in the connecting surface of the basic body. When at least one first male member in the connecting surface of the cutting insert is in engagement with the chute and has flank contact with the side-flank surfaces of the chute, a lower bearing surface of a second male member laterally spaced-apart from the first male member abuts against a support surface located in the connecting surface of the basic body and spaced-apart from the chute.

12 Claims, 5 Drawing Sheets

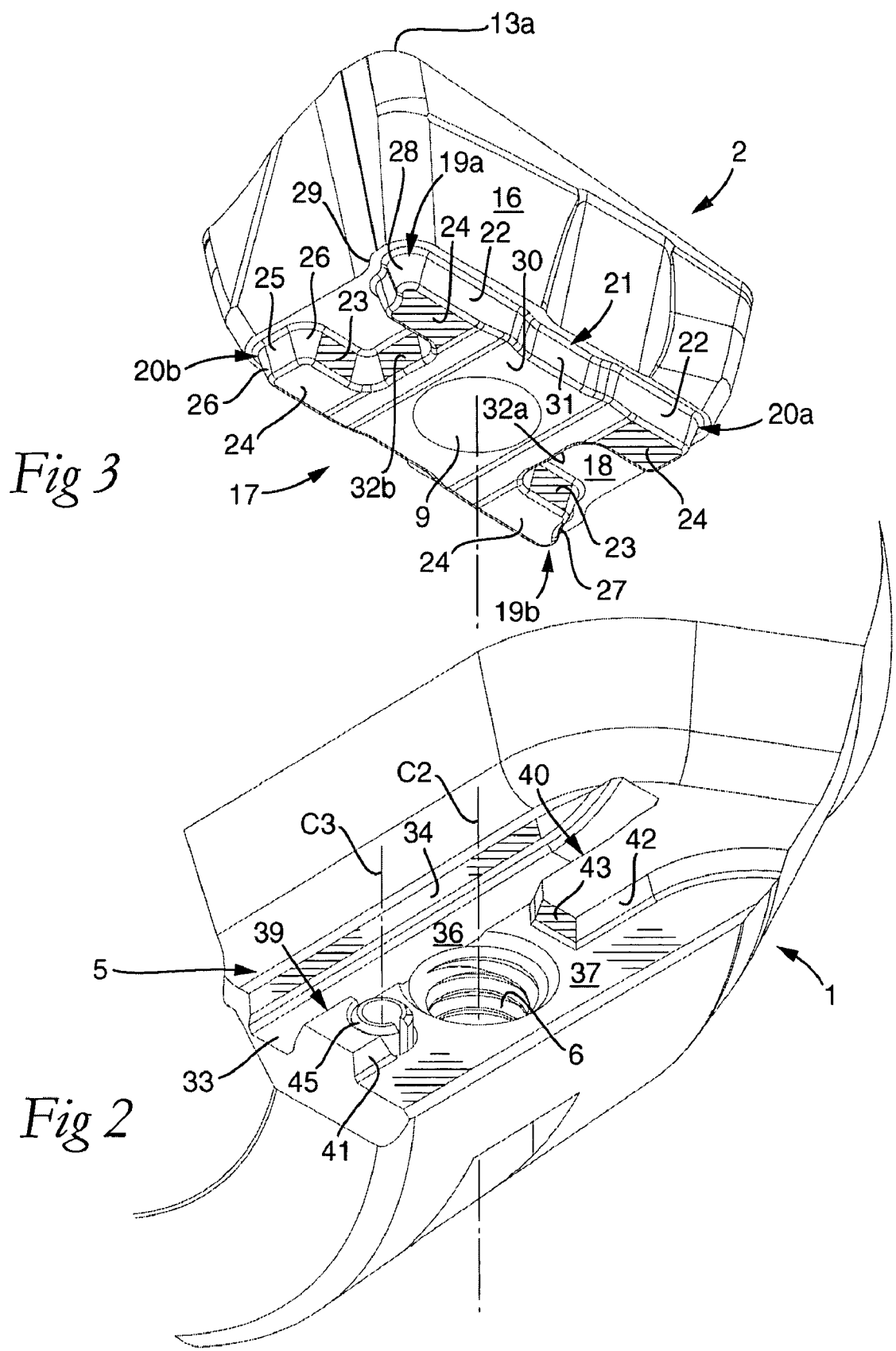

TOOL AND A CUTTING INSERT FOR CHIP REMOVING MACHINING

This application claims priority under 35 U.S.C. § 119 to Swedish Patent Application No. 0602676-9, filed on Dec. 12, 2006, which is incorporated by reference herein in its entirety.

FIELD OF THE INVENTION

The present invention relates generally to a cutting tool for chip removing machining of the type that includes a basic body and a cutting insert which is detachably connected to the basic body via an interface. The interface includes a first connecting surface formed in the basic body in which a chute is included that has two side-flank surfaces diverging from a bottom. The interface also includes a second connecting surface formed in the cutting insert in which there are included a number of male members having converging side-flank surfaces for abutment against the side-flank surfaces of the chute, and at least one transverse shoulder surface for abutment against a transverse stop surface in the connecting surface of the basic body. The invention also relates generally to a cutting insert as such.

BACKGROUND OF THE INVENTION

Within the field of chip removing or cutting machining of blanks of metal, a continuous development is going on with the purpose of making more effective not only the capacity of the tools to carry out the machining in a fast and accurate way, but also the manufacture of the different parts of the tools in the form of basic bodies (e.g. holders) and replaceable cutting inserts. A trend of development is to improve the machining results in respect of the precision and surface finish, which requires that the active cutting edge of the cutting insert obtains an exact, predetermined space position in relation to the basic body. Another trend is to reduce the costs of the manufacture of the tools. This has, among other things, led to the cutting inserts being made from cemented carbide, which are most commonly occurring on the market, already in connection with the compression-moulding and sintering having obtained a better and better dimensional accuracy. In order to obtain a good precision of the cutting inserts, previously it was necessary to subject the inserts to expensive grinding operations, but with the improved compression-moulding and sintering technique, it has become possible to use direct-pressed, i.e., unground, cutting inserts in more and more applications. However, the development has not progressed further than that the tool designer still has to allow for a dimensional variation of the order of ±0.5% of the nominal dimensions of the cutting insert. This means that the active edge of the cutting insert very well may end up in the desired position when the result of the insert manufacture is good, but when the result is poorer (so far that the cutting insert has swollen and become longer, or shrunk and become shorter than intended), the position of the cutting edge in relation to the basic body may deviate to such a high extent from the desired position that the machining precision will become less good.

Recently, tools have been developed, the interfaces of which between the basic body and the cutting insert are formed with connecting surfaces that individually include male-like as well as female-like engagement structures engaging each other. Originally, the connecting surfaces included so-called serration connecting surfaces, of the type that includes a plurality of parallel, male-like ridges and female-like grooves, the ridges of which in one of the connecting surfaces engage the grooves of the other connecting surface, and vice versa. In the next development step, the interfaces were refined by the fact that certain ridges were orientated at right or other angles to the other ridges, often in combination with the number of ridges being reduced. However, common to previously known interfaces is still that the male-like engagement structures are more or less elongate, straight ridges having inclined flanks, which provide for the positioning of the cutting insert as well as the transfer of force from the cutting insert to the basic body, by the fact that the flanks of the ridges should have a good contact along the entire length thereof, at the same time as the ridges must not touch the bottom of the appurtenant grooves.

Within the art of chip removing machining, there is a difference between theory and practice. Thus, in theory, it is fairly simple to construct interfaces that have optimal properties in respect of stably fixing the cutting insert and the active cutting edge thereof in an exact predetermined position in relation to the basic body, and ensuring good absorption of the various forces that act on the cutting insert during operation. However, in practice, the stability and position of the cutting insert are affected by a number of unforeseeable factors, one of the most difficult to master of which is the varying result of the manufacture of the cutting inserts. As long as the result gives a good, nominal dimensional accuracy, the intended and calculated surface or line contact, among other things, is obtained between the flanks of the ridges and of the grooves along the entire length of the flanks, but when even moderate form defects arise, there is a risk that the contact between the flanks is reduced to point contacts or partial line contact. This may in turn result in the cutting insert, initially as well as during operation, being positioned incorrectly in relation to the basic body (by so-called overdetermination), and that the transfer of force between the cutting insert and the basic body becomes inferior.

As an example of prior art, reference is made to U.S. Pat. No. 6,146,061, which discloses a cutting tool, the replaceable cutting insert of which is connected to a tool basic body via an interface, the two co-operating connecting surfaces of which include mutually intersecting serrations in the form of long narrow male and female members. More precisely, two first, mutually parallel chutes are formed in the connecting surface of the basic body, which are delimited by diverging side-flank surfaces, and which are intersected by a second transverse chute extending perpendicularly to the first chutes and likewise is delimited by diverging flank surfaces. The connecting surface of the cutting insert includes, on one hand, two first, longitudinal and mutually parallel male members in the form of ridges having converging side-flank surfaces, and on the other hand two male members or ridges projecting at right angles from the external side-flank surfaces of the first ridges, the width of which is somewhat smaller than the width of the transverse chute. When the cutting insert is applied with the connecting surface thereof in engagement with the connecting surface of the basic body, the cutting insert is guided axially by the fact that the two side-flank surfaces of the central ridges abut against the two side-flank surfaces of the central chutes, i.e., the two ridges have flank contact with the two chutes without touching the bottom of the same. In order to determine the axial position of the cutting insert along the length extension of the central chutes, rear flank surfaces on the two projecting, transverse ridges are pressed against the rear flank surfaces in the transverse chute, more precisely by an elastically resilient screw used to finally fix the cutting insert.

In theory, the above-mentioned way to fix the cutting insert is attractive, but in practice, the cutting insert may come to be mis-positioned. Such a mis-positioning is particularly awkward if the cutting insert is indexable and includes two or several active cutting edges situated along corners of the cutting insert. In particular, if form defects arise in the manufacture of the cutting inserts, e.g., so far that one of the ridges shrinks or swells in relation to the other, the cutting insert will assume a "tilted" or inclined position in the connecting surface of the basic body. Another disadvantage with the known tool is that the connecting surface of the basic body includes a comparatively large number of flank surfaces, which already, as a consequence of the large number thereof, complicate the manufacture of the basic body and increases the risk of sources of error.

The present invention aims at overcoming the above-mentioned problems by providing a cutting tool having an improved interface between the basic body of the tool and the individual cutting insert. Therefore, an object of the invention is to provide a tool having an interface that, on one hand, can fix the cutting insert stably in such a way that the active cutting edge of the cutting insert is reliably located in a correct, non-overdetermined position in relation to the basic body, and on the other hand can absorb considerable cutting forces in the area where the need for stability is the greatest, viz. in the immediate vicinity of the corner of the cutting insert that includes the active cutting edge.

Another object of the invention is to provide an interface that not only locates the cutting insert in the desired way initially in connection with the mounting, but also can retain the stable fixation of the cutting insert under the severe stresses encountered by the cutting insert during the chip removing machining. In addition to affording an improved absorption of such forces that act in the direction from above and down into the cutting insert, the interface should therefore prevent the cutting insert from becoming translated and rotated, respectively, in relation to the basic body.

Yet another object of the invention is to provide an interface that ensures the desired properties in respect of the positional accuracy and the force-transfer capacity, without the manufacture of the basic body and cutting insert of the tool being made more difficult or more expensive. In particular, the cutting insert should, if required, be possible to be manufactured by direct pressing, i.e., without needing to be subjected to expensive grinding operations.

Still another object of the invention is to provide a tool, the cutting inserts of which can be fixed in an exactly predetermined end position without the help of any resilient screw. Furthermore, the connecting surface of the basic body should be easy to manufacture and contain as few limiting surfaces as possible.

Still another object of the invention is to provide a cutting tool, the cutting inserts of which can be indexed in two or more positions.

SUMMARY OF THE INVENTION

In an embodiment, the invention provides a tool for chip removing machining, including a basic body and a cutting insert detachably connected to the basic body via an interface. The interface includes a first connecting surface formed in the basic body in which a chute is formed that has two side-flank surfaces diverging from a bottom. The interface also includes a second connecting surface formed in the cutting insert in which there are formed a number of male members having converging side-flank surfaces that abut against the side-flank surfaces of the chute, and at least one transverse shoulder surface that abuts against a transverse stop surface in the connecting surface of the basic body. When at least one first male member in the connecting surface of the cutting insert is in engagement with the chute and has flank contact with the side-flank surfaces of the chute, a lower bearing surface of a second male member laterally spaced-apart from the first male member abuts against a support surface located in the connecting surface of the basic body and spaced-apart from the chute.

In another embodiment, the invention provides a cutting insert for chip removing machining, including a connecting surface including a number of male members having side-flank surfaces, and at least one shoulder surface that is transverse in relation to the side-flank surfaces. The cutting insert is indexable by including at least two cutting edges. The connecting surface includes two laterally mutually separated pairs of male members, two of which in a first pair are axially spaced-apart from each other, and two of which in a second pair are axially spaced apart from each other, and which include lower surfaces as bearing surfaces. Between the pairs of male members, two spaced-apart shoulder surfaces are formed.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 2 is an enlarged top-side view showing a first connecting surface included in the basic body;

FIG. 3 is a bottom-side view of the cutting insert, showing a second connecting surface included in the underside of the cutting insert;

DETAILED DESCRIPTION OF THE PREFERRED EMBODIMENTS

Figure 1:
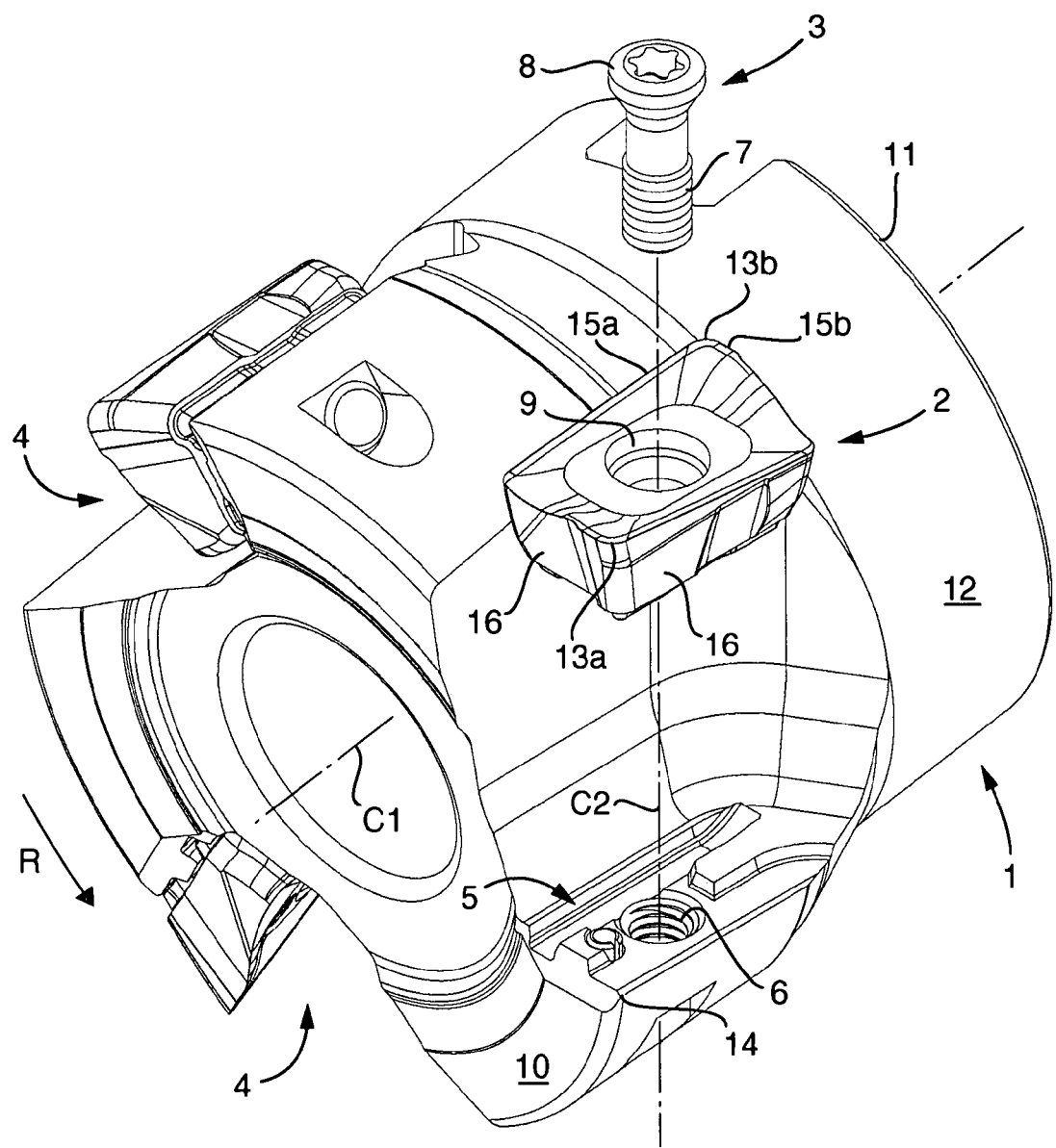
FIG. 1 is a perspective exploded view showing a tool in the form of a milling cutter, and a milling or cutting insert and a tightening screw for the fixation of the insert being shown spaced-apart from the basic body of the tool.

In FIG. 1, a tool for chip removing machining is shown, which includes a basic body 1 and a number of cutting inserts 2, which are fixable in the basic body by tightening members 3, which in this case are in the form of screws. In the example, the tool is rotatable, more precisely in the direction of rotation R around a center axis designated C1, and includes a milling cutter in the form of an end or face mill, which includes a plurality of chip pockets 4 in which the same number of cutting inserts 2 are mounted. In the lower part of each chip pocket, a first connecting surface is formed, generally designated 5, in which a hole 6 having a female thread mouths.

With continued reference to FIG. 1, the tightening screw 3 includes a shank having a male thread 7 and a head 8, which in this case is conical, but which also may have other shapes, e.g., flat. In the cutting insert 2, a central hole 9 is formed, through which the screw can be inserted and tightened in the hole 6. A common center axis of the screw, the cutting insert and the screw hole is designated C2 in FIG. 1.

In this case, the proper basic body 1 is delimited by a front end surface 10, a rear end surface 11, and an envelope surface 12 having a rotationally symmetrical basic shape.

In the shown, preferred example, the individual cutting insert 2 is indexable by including two cutting edges 13 adjacent to diametrically opposed corners of the cutting insert. Among the cutting edges, the cutting edge 13a identified by index "a" is active by being indexed forward into a position in the vicinity of the free corner 14 of the basic body that is formed where the end surface 10, the envelope surface 12 and the connecting surface 5 meet each other. However, in the shown position, the other cutting edge 13b is inactive. In this connection, each individual cutting edge 13 includes a longitudinal, chip-removing main edge 15a, as well as a transverse wiper edge 15b having the purpose of wiping off and leveling the surface generated during milling. Clearance surfaces 16 extend between the topside and underside of the cutting insert.

Now, reference is made to FIGS. 2 and 3, which in more detail illustrate the design of not only the first connecting surface 5 in the basic body 1, but also a co-operating second connecting surface 17 on the underside of the cutting insert. A certain part of said second connecting surface 17 is a plane surface 18, which forms the proper underside of the cutting insert. In the connecting surface, four male members 19a, 19b and 20a, 20b are included, which generally are in the form of legs or fingers that protrude towards opposite directions from a common, central base part 21. Each individual leg is delimited by external and internal side-flank surfaces 22, 23, which together converge from the underside 18 toward a lower, suitably plane bearing surface 24. The free ends of the legs 20a, 20b are formed of plane end surfaces 25, which transform into the side-flank surfaces 22, 23 via arched part surfaces 26. The ends of those two legs 19a, 19b that are situated immediately below the two diametrically opposed corner edges 13a, 13b, are composed of a concave end surface 27, as well as a convex part surface 28, which closely follows the peripheral borderline 29 between the underside 18 and the clearance surfaces 16. In such a way, the area of the individual bearing surface 24 is optimized and thereby the bearing capacity of the legs in the active corner of the cutting insert, which are heavily loaded by the cutting forces, is also optimized.

In the shown, preferred embodiment, in which the cutting insert is indexable, the lower bearing surfaces 24 of all four legs are situated in a common plane, i.e., the measures by which the legs project vertically from the underside 18 of the cutting insert are the same. This common plane is situated on a level below the underside 30 of the base part 21. In other words, the underside of the base part is somewhat countersunk in relation to the bearing surfaces 24, which means that the individual bearing surfaces are spaced-apart from each other not only laterally but also axially.

Figure 5:
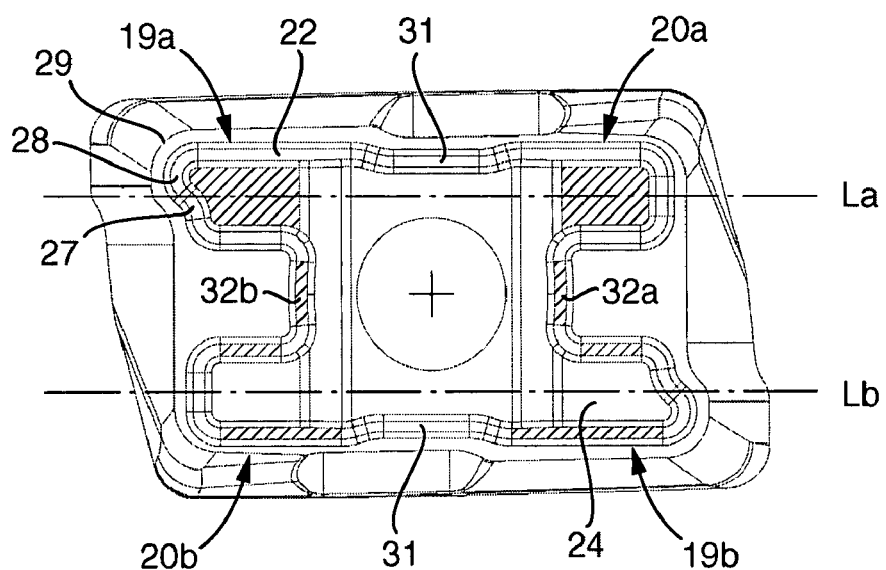
FIG. 5 is a planar view from below of the connecting surface of the cutting insert.

As is seen in FIG. 5, the two legs 19a, 20a on one side of the cutting insert are situated one after the other along a common, geometrical line La, which is parallel to a line Lb along which the two other legs 19b, 20b are located. Between the external side-flank surfaces 22 of the legs 19a, 20a (and 19b, 20b, respectively), a clearance surface 31 is formed, which axially separates the side-flank surfaces 22 from each other. In FIG. 5, it is seen that the four legs, together with the base part 21, form a generally H-shaped configuration on the underside of the cutting insert.

The base part 21 is formed with two diametrically opposed shoulder surfaces 32a, 32b, which are transverse in relation to the protruding legs, preferably perpendicular to the lines La, Lb. Furthermore, the shoulder surfaces 32a, 32b are inclined at an obtuse angle, e.g., within the range of 100-135°, to the underside 18 of the cutting insert. In the example, the obtuse angle is 110°.

Figure 4:
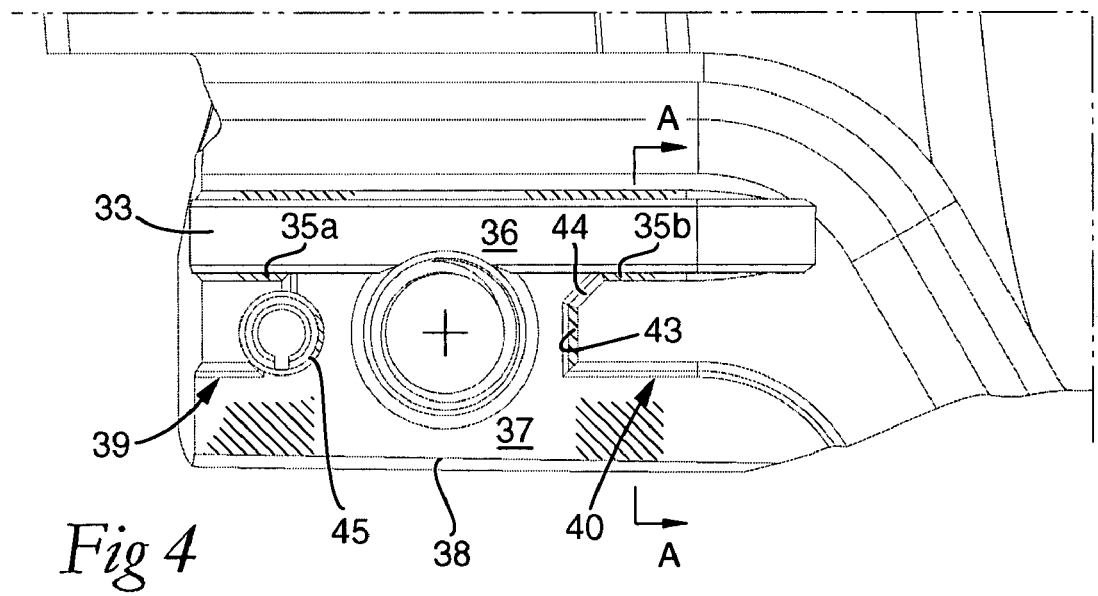
FIG. 4 is a planar view from above of the connecting surface of the basic body.
Figure 6:
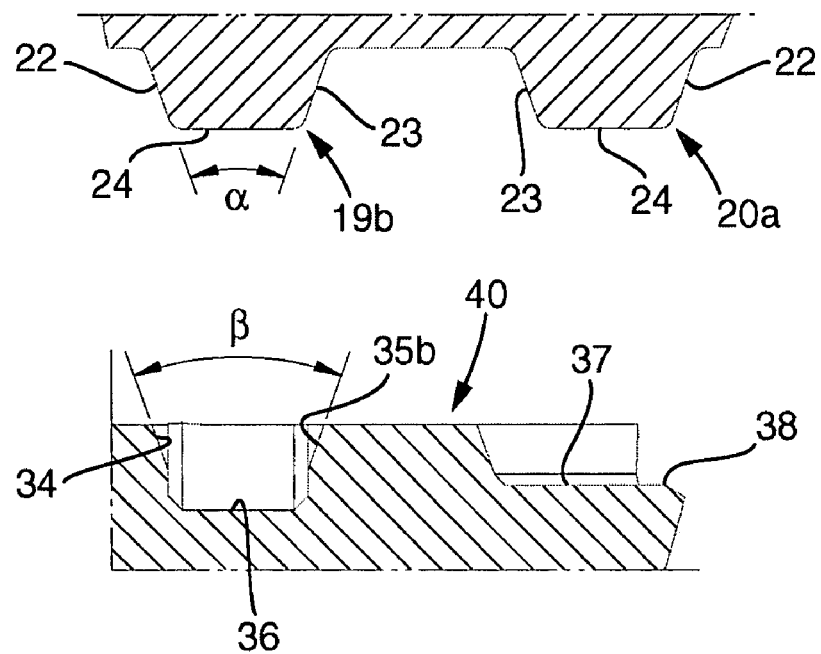
FIG. 6 is a cross section A-A in FIG. 4, the cutting insert being shown spaced-apart from the connecting surface of the basic body.
Figure 7:
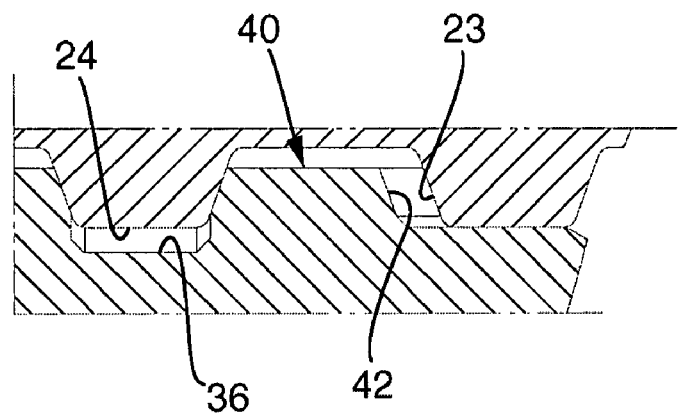
FIG. 7 is an analogous cross section showing the cutting insert in a mounted state.

Reference is now made to FIGS. 2 and 4, which illustrate the nature of the connecting surface 5. In the connecting surface, a single female-like engagement structure is included in the form of an elongate chute 33, which is delimited by a radially inner flank surface 34, as well as by two radially outer part surfaces 35a, 35b, which together form a second side-flank surface. As is seen in FIG. 6 (section A-A in FIG. 4), the two side-flank surfaces 34, 35 diverge in the direction from a bottom 36 toward the upper opening of the chute, more precisely at a divergence angle β that advantageously is somewhat smaller than the convergence angle α between the side-flank surfaces 22, 23 of the legs 19, 20. The chute 33 is countersunk in a bottom support surface that is designated 37 and partly extends from the chute 33 to a radially outer, axial borderline 38. It is clearly seen in FIG. 6 that the bottom 36 of the chute 33 is situated on a level below the support surface 37. Between the chute 33 and the (radially) outer part of the support surface 37, front and rear lugs or ridges 39, 40 are formed, on which the outer side-flank surfaces 35a, 35b of the chute 33 are formed, opposite side surfaces of the lugs being designated 41, 42. The axially rear lug 40 ends in a stop surface 43, which forms an obtuse angle with the adjacent support surface 37. In practice, the stop surface 43 may be plane or slightly arched, and form approximately the same angle, e.g., 110°, with the support surface 37 as the shoulder surfaces 32a, 32b form with the underside 18 of the cutting insert. Between the stop surface 43 and the adjacent side-flank surface 35b, a facet surface 44 is formed.

Adjacent to the axially front lug 39, more precisely on the back side thereof, a spring 45 is arranged, which, in the example shown, is in the form of an elastically resilient upright that projects upward a distance from the support surface 37. More precisely, the upright 45 is in the form of a slit-spring pin stuck down into a hole mouthing in the support surface 37, the center axis of which is designated C3 (see FIG. 2). The center axes C2, C3 of the screw hole and the pin hole, respectively, are mutually parallel and situated in a common plane, which is perpendicular to the support surface 37 and run parallel to the length extension of the chute 33. This means that slit-spring pin can apply a tightening force to the cutting insert, which is directed axially rearward toward the lug 40. In practice, the slit-spring pin 45 may advantageously be formed with a chamfered, conical guide surface at the upper, free end thereof.

In the example in the drawings, where the basic body is a milling-cutter head, the chute 33 extends generally axially, i.e., approximately parallel to the center axis C1 of the tool. Of course, the interface according to the invention may also be located with the chute oriented radially or at other acute angles to the center axis.

When the cutting insert is to be fixed in the insert seat to connecting surface 5 of the basic body, the insert is let down with the two legs 19b, 20b into the chute 33. In doing so, the respective internal and external side-flank surfaces 23, 22 of the legs get contact with the side-flank surfaces 35, 34 of the chute without the lower bearing surfaces 24 of the legs contacting the bottom surface 36 of the chute. In other words, the two legs 19b, 20b do not bottom in the chute 33. Simultaneously, the lower bearing surfaces 24 of the two legs 19a, 20a are pressed against the support surface 37 (see also FIGS.

6 and 7), however without the internal flank surfaces 23 of the legs 19a, 20a contacting the radially outer limiting surfaces 41, 42 of the lugs 39, 40. This means that the outer the legs 19a, 20a, positioned closest to the periphery of the milling-cutter body, rest against the support surface 37 without simultaneously having flank contact with the lugs 39, 40.

When the cutting insert has been put in place in the insert seat of the basic body and tightening of the tightening screw 3 has commenced, the following takes place:

The axially rear shoulder surface 32a (that is inclined in relation to the underside 18 of the cutting insert) slides down along the inclined stop surface 43 in the connecting surface 5 of the basic body. In co-operation with the opposite shoulder surface 32b, which abuts against the conical guide surface of slit-spring pin 45, a wedge action, which deforms the slit-spring pin elastically, is achieved during the continued tightening of the tightening screw. This results in the slit-spring pin generating a tightening force, which presses the cutting insert axially in the backward direction until the surfaces 32a and 43 are in close contact with each other. In this state, the cutting insert has reached the predetermined end position thereof, in which the final fixation of the cutting insert is effected by tightening the screw using a predetermined torque. In this connection, the external and internal side-flank surfaces 22, 23 of the legs 19b, 20b abut against the axially spaced-apart, shaded surface fields shown at the top in FIG. 4. Simultaneously, the two other legs 19a, 20a have contact with the basic body only via the lower bearing surfaces 24 thereof, which have contact with the two shaded surface fields shown at the bottom in FIG. 4.

A fundamental advantage of the tool according to the invention is that possible form defects in connection with the manufacture of the cutting inserts have little or no impact on the correct positioning of the cutting insert. Thus, if the mutual distance laterally between the pairs of legs 19a, 20a and 19b, 20b, or the individual shape of the different legs, would deviate from the nominally desired measures, no overdetermination of the cutting insert occurs, because the radially outer pair of legs rests against the support surface 37 without having flank contact with the adjacent lugs 39,40. Furthermore, the long narrow shape of the single chute ensures that the cutting insert does not rotate out from the predetermined position. Simultaneously, axial motion of the cutting insert is prevented by the transverse shoulder surface in the connecting surface of the cutting insert being pressed in close contact against the co-operating stop surface in the connecting surface of the basic body. A particular advantage is that the axial tensioning of the cutting insert against the stop surface is not effected by any resilient screw, but rather by the particular spring pin that can apply an axial tightening force to the cutting insert already by the fact that the screw moves vertically down into the hole. This means that the screw can be tightened by an absolute vertical motion without needing to be deflected, somewhat which ensures that the screw can apply a very large vertical tightening force to the cutting insert as well as that the screw gets a long service life. Furthermore, the lower bearing surfaces on the undersides of the legs or of the male members are ample, which means that large cutting forces can be transferred vertically through the cutting insert exactly where the cutting forces are maximal, viz. adjacent to the active cutting edge of the cutting insert. Thus, the flank contact less suitable for the purpose, which characterizes the cutting insert according to U.S. Pat. No. 6,146,061, is isolated to the part of the cutting insert positioned closest to the center of rotation and where the vertical forces through the cutting insert are considerably reduced. Finally, the connecting surface of the basic body includes utmost few limiting surfaces and therefore is easy to produce.

Figure 8:
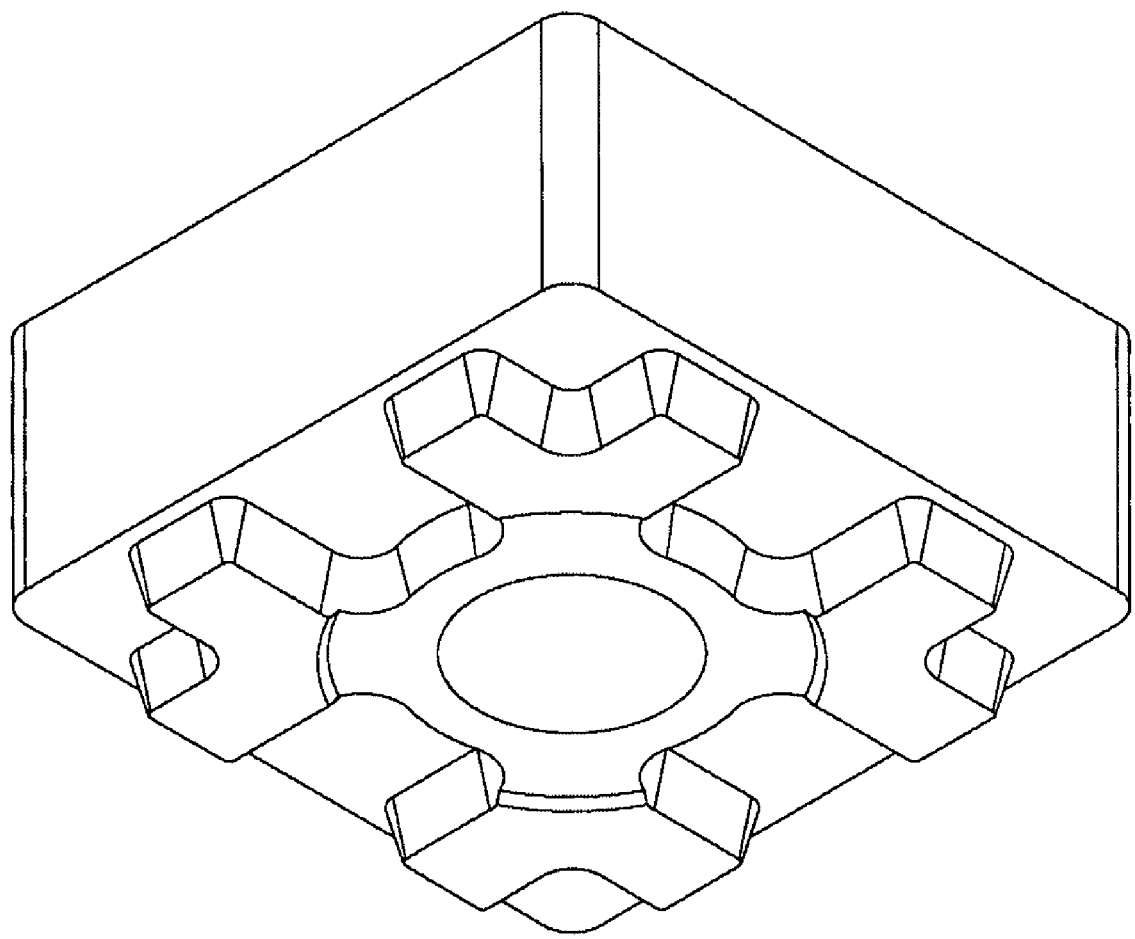
FIG. 8 is a bottom-side view showing an alternative embodiment of the cutting insert according to the invention.

In FIG. 8, an alternative embodiment is shown in which the connecting surface of the cutting insert is formed with four pairs of male members in the form of legs, which protrude from a common base part having four equidistantly spaced-apart shoulder surfaces. The pairs of co-operating legs are arranged at right angles to each other, whereby the cutting insert can be indexed into four different positions. The embodiment shown in FIG. 8, which is particularly suitable for larger cutting inserts, naturally requires that particular lateral spaces are formed adjacent to the chute in the basic body, in order to accommodate two of the four legs that are not active in each given index position.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
   a basic body; and
   a cutting insert detachably connected to the basic body via an interface;
   the interface including:
   a first connecting surface formed in the basic body in which a chute is formed that has two side-flank surfaces diverging from a bottom, and
   a second connecting surface formed in the cutting insert in which there are formed a number of male members having converging side-flank surfaces that abut against the side-flank surfaces of the chute, and at least one transverse shoulder surface that abuts against a transverse stop surface in the connecting surface of the basic body,
   wherein, when at least one first male member in the connecting surface of the cutting insert is in engagement with the chute and has flank contact with the side-flank surfaces of the chute, a lower bearing surface of a second male member laterally spaced-apart from the first male member abuts against a support surface located in the connecting surface of the basic body and spaced-apart from the chute.

2. The tool according to claim 1, the cutting insert being indexable by including at least two cutting edges, wherein the connecting surface of the basic body includes a lug situated between the chute and the support surface on which the stop surface is formed, and wherein the connecting surface of the cutting insert includes two laterally spaced-apart pairs of male members, two of which in a first pair are axially spaced-apart, and two of which in a second pair are axially spaced apart, wherein between the pairs of male members, two axially spaced-apart, transverse shoulder surfaces are formed, one of which is pressed against the stop surface to prevent axial displacement of the cutting insert.

3. The tool according to claim 2, wherein the male members are in the form of legs that project from a common base part while forming a generally H-shaped configuration on an underside of the cutting insert.

4. The tool according to claim 3, wherein the two transverse shoulder surfaces are formed on the base part.

5. The tool according to claim 4, wherein lower bearing surfaces of the legs are located in a common plane situated on a level below an underside of the base part.

6. The tool according to claim 2, wherein, between the chute and the support surface in the connecting surface of the basic body, two axially spaced-apart lugs are formed, a rear one of which is situated at a rear end of the chute and includes the stop surface, a front one of which is situated at a front end of the chute, the lugs including side part surfaces, which together form one of the two flank surfaces of the chute.

7. The tool according to claim 6, wherein a base part included in the connecting surface of the cutting insert is located between the two lugs that are included in the connecting surface of the basic body.

8. The tool according to claim 7, wherein, in the vicinity of the front lug, a spring presses one shoulder surface of the base part against the stop surface of the rear lug.

9. A cutting insert for chip removing machining, comprising: a connecting surface including a number of male members having side-flank surfaces, and at least one shoulder surface that is transverse in relation to the side-flank surfaces, the cutting insert being indexable by including at least two cutting edges, wherein the connecting surface includes two laterally mutually separated pairs of male members, two of which in a first pair are axially spaced-apart from each other, and two of which in a second pair are axially spaced apart from each other, and which include lower surfaces as bearing surfaces, wherein between the pairs of male members, two spaced-apart shoulder surfaces are formed.

10. The cutting insert according to claim 9, wherein the male members are in the form of legs that project from a common base part while forming a generally H-shaped configuration on an underside of the cutting insert.

11. The cutting insert according to claim 10, wherein the two transverse shoulder surfaces are formed on the base part.

12. The cutting insert according to claim 11, wherein the lower bearing surfaces of the male members are located in a common plane situated on a level below the underside of the base part.

* * * * *